July 31, 1956

C. J. CARTER 2,757,220

THERMOCOUPLE

Filed March 10, 1955

INVENTOR.
Charles J. Carter
BY
Smith Olsen Baird
& Gulbrandsen, Attys.

United States Patent Office 2,757,220
Patented July 31, 1956

2,757,220

THERMOCOUPLE

Charles J. Carter, Milwaukee, Wis., assignor to General Electric Company, a corporation of New York Application March 10, 1955, Serial No. 493,430

13 Claims. (Cl. 136—4)

This invention relates to thermocouples and particularly to an improved construction for thermocouple junctions and the method of making the same.

Thermocouples in many applications must withstand extreme operating conditions. An example of a thermocouple application in which extreme operating conditions are encountered in the use to measure the temperature of the exhaust stream in aircraft gas turbine engines. Thermocouples in the exhaust stream of gas turbine engines are important control elements in that the temperature sensed thereby is used to control the fuel injection into the combustion chambers so that the engine temperatures do not exceed certain critical values. The changes in the temperature of the jet exhaust stream can be very rapid. A very short period of operation at temperatures above certain critical temperatures can quickly burn out or destroy operating parts of the engine causing failure or destruction of the engine.

The operating conditions encountered in jet exhaust streams are severe since the velocity of the jet stream is very high and the temperature of the stream is very high. Although efforts are made to filter the air intake to the engines, a certain amount of debris passes through the engine and causes erosion of all parts in the path of the jet stream including the temperature sensing junctions of thermocouples extending therein. Incomplete combustion of the fuel can also develop abrasive particles as well as corrosive compounds which are thrown against and act upon the thermocouple junction in the jet exhaust stream.

In order properly to perform as a part of the fuel injection control system, the thermocouples in the jet exhaust stream must possess a good response rate so that even rapid changes in temperature are accurately detected and the presence of these high temperatures communicated to the control devices so that the temperature of the jet stream is reduced by decreasing the fuel input before the engine parts are damaged or burned out. The thermocouples must also be able to withstand severe thermal shock since the temperature of the jet stream can change very rapidly particularly when the engine is started.

A type of thermocouple particularly adapted for use in the application described is a thermocouple having as the active metal conductors, a Chromel electrode and an Alumel electrode suitably welded together to form a thermocouple junction. The portions of the thermocouple conductors or wires leading from the junction must be insulated from each other and from the mounting therefor and to this end the thermocouple wires are preferably packed in an insulating core such as of alumina or magnesia. Another problem is encountered in using thermocouples of this type in jet streams in that although the core of insulating material is treated to make it impervious to fluids, the interfaces between the insulating material and the thermocouple wires usually have not been heretofore successfully sealed. As a result liquids including fuel tend to creep up the thermocouple wires on the surface thereof and become trapped by the insulating material of the core. This is particularly troublesome when rapidly accelerating or deaccelerating since large amounts of unburned fuel may pass out with the exhaust stream at these times. The fuel absorbed between the thermocouple wires and the insulating core is soon carbonized by the high temperatures present to form a conductive material which greatly lowers the insulation resistance and impairs the performance of the thermocouple.

Accordingly, it is an important object of the present invention to provide an improved thermocouple and particularly a thermocouple which is suitable for use in regions experiencing extreme operating conditions.

More specifically, it is an important object of the present invention to provide an improved thermocouple of the type set forth in which the thermocouple junction is fully protected from the surrounding media and yet performs its function in a satisfactory manner.

Another object of the invention is to provide a thermocouple having a protected junction which has a long operating life when utilized to measure high temperatures in high velocity streams under corrosive and abrasive operating conditions.

Yet another object of the invention is to provide a thermocouple having a protected junction of the type set forth which has a good response rate and a steady calibration characteristic.

Still another object of the invention is to provide a thermocouple having an enamel coated junction, the enamel coating on the junction sealing the point of access to the inner face between the thermocouple wires and the insulating materials surrounding the thermocouple wires in the thermocouple mount.

Yet another object of the invention is to provide an improved thermocouple including a pair of conductors of dissimilar metals forming a thermocouple junction, the junction being coated with an enamel composition which adheres well to both metals and to the junction thereof and has a coefficient of expansion comparable to both dissimilar metals.

Another object of the invention is to provide a thermocouple coated with a single uniform layer of fired ceramic applied in one step.

Still another object of the invention is to provide a thermocouple of the type set forth having an enamel coated junction, the junction having good thermocouple operating characteristics in which the enamel coating is resistant to thermal shock and will provide long operating life under extreme operating conditions.

A further object of the invention is to provide an improved method for applying enamel coatings to thermocouple junctions of the type set forth.

These and other objects and advantages of the present invention will be better understood from the following description when taken in conjunction with the accompanying drawing. In the drawing wherein like reference numerals have been utilized to designate like parts throughout:

Figure 1:
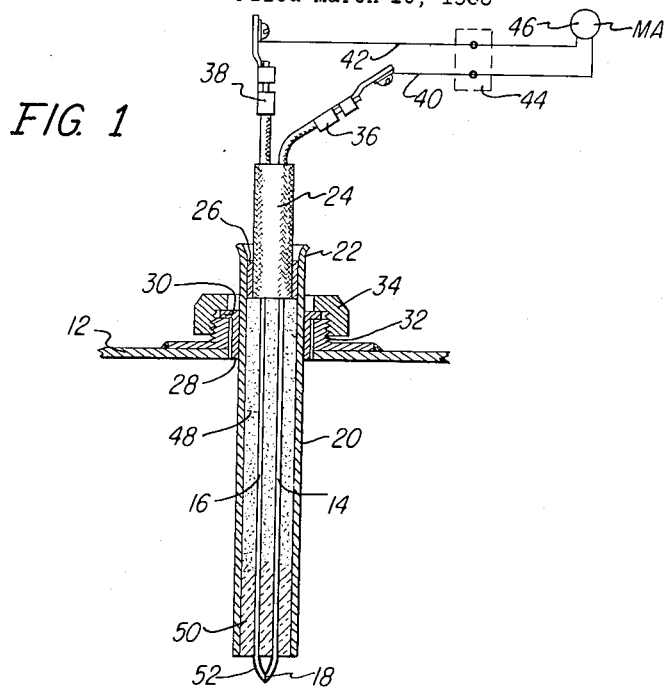
Figure 1 is a view in longitudinal section through a thermocouple made in accordance with and embodying the principles of the present invention, the thermocouple being shown schematically connected to an indicating circuit.
Figure 2:
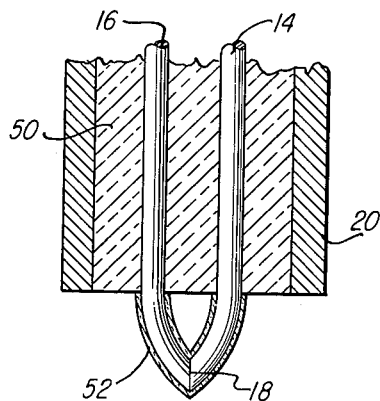
Figure 2 is an enlarged view in longitudinal section through the end of the thermocouple and the thermocouple junction, a butt-welded V-junction being illustrated.

Referring to the drawing and particularly to Figure 1 thereof, there is shown a high temperature thermocouple made in accordance with and embodying the principles of the present invention. The thermocouple assembly is generally designated by the numeral 10 and is mounted in an aperture in a wall 12 of a gas turbine engine. For purposes of illustration, the thermocouple assembly 10 will be shown and described as incorporated in such an engine but it is to be understood that the thermocouple can be used to advantage in any similar application where similar operating conditions are encountered. The operative conductors of the thermocouple are conductors 14 and 16 which are formed of dissimilar metals and joined at one extremity thereof at a junction 18. Junction 18 is illustrated as being of the butt-welded V-type in Figures 1 and 2. Conductor 14 is preferably formed from a nickel-chromium alloy consisting, for example, of 90% nickel and 10% chromium. Such an alloy is available under the trademark "Chromel-P" and is generally referred to as a Chromel conductor. The other conductor 16 is preferably formed from a nickel-aluminum alloy which may also contain small amounts of manganese and silicon and consisting, for example, of 95% nickel, 2% aluminum, 2% manganese, and 1% silicon, and is generally referred to as an Alumel conductor.

Surrounding conductors 14 and 16 is a substantially cylindrical housing 20 which is formed of any suitable metal such as stainless steel which will withstand the extreme operating conditions encountered. The upper end of housing 20 extends through the aperture in housing 12 and is flared outwardly as at 22 at its outer end to protect the insulated thermocouple cable 24 which receives the upper ends of conductors 14 and 16. A bushing 26 formed of brass or other malleable metal is provided to position cable 24 within housing 20 at the desired point.

Means is provided to mount housing 20 through the aperture in wall 12 in the form of a mounting flange 28 which is preferably welded to housing 20 and has an outwardly directed flange 30 formed thereon. Flange 30 is adapted to overlie an externally threaded member 32 secured as by welding to wall 12. An internally threaded nut 34 engages the threads on member 32 and clamps flange 30 thereagainst. In this manner the thermocouple assembly 20 is fixedly mounted in position through the aperture in wall 12.

Terminals 36 and 38 are provided for the ends of thermocouple conductors 14 and 16, respectively, and these connect to a pair of conductors 40 and 42 formed of corresponding metals. Conductors 40 and 42 are connected to a reference junction 44 which is usually placed at a point protected from the high temperatures of the gas turbine engine and in certain instances an ice point or other exactly determined reference temperature may be used for greater accuracy. A milliammeter 46 is shown connected to the circuit to record the current flow caused by the difference in the temperatures between the hot junction 18 and the reference junction 44. Milliammeter 46 may have a temperature scale calibration or a more accurate measuring means such as a potentiometer may be used in place of the milliammeter 46.

Disposed within cylindrical housing 20 and about the thermocouple conductors 14 and 16 is a quantity of refractory insulating powder 48. Powder 48 preferably extends from the bushing 26 downwardly to the lower end of housing 20 and forms an insulating core about the conductors 14—16 insulating them from each other and from housing 20. A preferred material for powder 48 is alumina or magnesia to which a small amount of cementitious powder may be added.

One preferred method of forming the refractory core 48 is to mix a small amount of relatively low melting cementitious material with the refractory powder. The powdered mixture is then packed in housing 20 and the lower end of housing 20 (the end adjacent junction 18) is suitably heated. The cementitious material fuses and binds the refractory powder to form a solid plug 50. The cementitious material may suitably consist of, for example, a small percentage of clay, glass forming substances, or other materials so long as they do not fuse at the temperatures encountered in the thermocouple installation nor require so high a fusing temperature as to injure the thermocouple housing 20 on the conductors 14—16 when plug 50 is formed. A plug 50 as formed in this manner extends for a suitable distance from the junction end of the housing, one-quarter of the length of the housing 20 being satisfactory, leaving the remainder of the refractory cement in a powdered state.

Another way of hardening the refractory material 48 to form a plug 50 is to compact firmly the powder at point 50 without use of a cementitious material. This can be accomplished by packing the refractory material, preferably magnesia, in the housing, temporarily closing off the junction end of the housing, and swaging or otherwise working the junction end portion of the housing to reduce its volume. Under the high pressures thus applied, the refractory material 48 at point 50 becomes a hard solid mass or plug in which conductors 14 and 16 are firmly imbedded. The refractory material in the remainder of the housing remains in a powdered state.

According to the present invention, the exposed portions of thermocouple conductors 14 and 16 including the junction 18 are enclosed within a fired enamel coating to protect them from the severe operating conditions encountered in gas turbine engine exhaust areas. More specifically, a fired enamel coating 52 is provided about the portions of conductors 14 and 16 extending beyond plug 50 and about the junction 18. Coating 52 is continuous and unbroken and seals against the compacted and impervious plug 50 described above.

In order to obtain the desired characteristics of enamel 52, a plurality of separate and distinct frits are employed in its manufacture. It is preferred to employ three so-called "stock frits" which may be described as molybdenum silicate glasses. The first of these frits has a relatively high proportion of titanium oxide. A second frit is utilized which has a relatively high cobalt oxide content. A third frit is used having a relatively high barium oxide content.

The three individual frits are blended together without chemical interaction or fusion and the blend is then mixed with refractory materials, suspension materials and water to form the enamel slip. The slip is milled to a standard fineness after which its specific gravity and pick-up are adjusted. The slip is then applied to the exposed portions of the thermocouple conductors 14 and 16 which have been annealed in a slightly reducing atmosphere. This annealing operation removes a major portion of gases, such as hydrogen, which may have been present in the thermocouple conductors, and thus conditions the conductors for optimum adhesion of the ceramic thereto. The coated thermocouple conductors and junction are then fired at an elevated temperature in a slightly reducing atmosphere.

In order to illustrate further the composition and the method of applying the enamel coating of the present invention, the following specific example will be given. It is to be understood that this example is given for purposes of illustration and it is to be understood that various changes and modifications can be made therein as will be more fully pointed out hereinafter without departing from the spirit and scope of the present invention.

Example I

Three stock frits having the following analyses are obtained:

| Ingredients | Frit Number | | |
|---|---|---|---|
| | 1 Percent by weight | 2 Percent by weight | 3 Percent by weight |
| Silica | 48.0 | 40.5 | 31.0 |
| Borax | 12.0 | 31.0 | 24.0 |
| Aluminum Hydrate | 4.5 | 5.0 | 2.0 |
| Molybdenum Oxide | 2.0 | 3.0 | 3.0 |
| Barium Oxide | 2.0 | 0.0 | 35.0 |
| Cobalt Oxide | 0.0 | 2.5 | 0.0 |
| Titanium Oxide | 12.5 | 0.0 | 0.0 |
| Fluorspar | 12.0 | 0.0 | 0.0 |
| Sodium Nitrate | 3.0 | 6.0 | 0.0 |
| Zinc Oxide | 4.0 | 12.0 | 0.0 |
| | | | 5.0 |
| | 100.0 | 100.0 | 100.0 |

A composite blended frit is then prepared from frits Nos. 1, 2 and 3 described above by mixing together 20 parts by weight of frit No. 1, 5 parts by weight of frit No. 2 and 75 parts by weight of frit No. 3. One hundred parts by weight of the blended frits are then mixed with 50 parts by weight of silica, 30 parts by weight of chromium oxide, 5 parts by weight of clay and 45 parts by weight of water. This mixture is then ground in a porcelain mill to a fineness such that only 0 to 1% by weight is retained by a 325 mesh U. S. standard screen. The specific gravity of the slip is established at about 1.65 and the slip is adjusted to a pick-up of 50 grams wet on a square foot plate. This produces the enamel slip to be used in coating the exposed portions of the conductors of the thermocouples.

The thermocouples to be coated are then annealed in a slightly reducing atmosphere for one hour at 1800° F. During the annealing, grease or other contaminants on the thermocouple wires is burned off. The atmosphere had the following composition by volume:

| | Percent |
|---|---|
| Hydrogen | 14.5 |
| Carbon monoxide | 10.6 |
| Carbon dioxide | 4.0 |
| Methane | 2.2 |
| Nitrogen | 68.7 |

The dew point of the atmosphere was maintained at 80° F. during annealing.

After annealing the thermocouple conductors are sandblasted with a 30 grit flint sand at a pressure of 5 pounds per square inch at the surface of the work. The freshly prepared slip described above is then sprayed on the exposed portions of the conductors 14—16 including the junction 18 to a thickness of 0.001 inch.

The coated thermocouple is then fired for 20 minutes at a temperature of 1925° F. in a slightly reducing atmosphere maintained at a dew point of 40° F. and having the following composition by volume:

| | Percent |
|---|---|
| Hydrogen | 11 |
| Carbon monoxide | 8.2 |
| Carbon dioxide | 6.2 |
| Methane | 1.5 |
| Nitrogen | 73.1 |

After firing, the enamel coating 52 on the exposed portions of the thermocouple conductors 14 and 16 was found to be continuous and firmly bonded to both the Alumel and Chromel conductors. Furthermore, a tight seal was found to have been made with the compacted core 50 so that the interface between the conductors 14 and 16 and the core 50 was sealed at the lower end. This seal between the fired ceramic coating 52 and the core 50 prevents fuel and other liquids from being carried along the interface between the conductors 14—16 and core 50. This is important since if fuel does move along conductors 14—16 into core 50, the fuel is soon carbonized by the extreme operating temperatures encountered. This results in a reduction of the resistance of the insulation of core 50 and causes a partial shorting of the conductors 14—16 to the housing 20 which is maintained at ground potential. This in turn gives a lower temperature indication than actually exists at the thermocouple junction and as a result of this lower temperature indication, the fuel-to-air ratio may be increased to a point where the temperature in the combustion chamber and in the exhaust zone is actually beyond the safe operating range. These excessive temperatures can cause extensive damage to jet engine components after a very short period of operation.

The coated thermocouple when tested was found to possess a response rate substantially the same as that of a thermocouple in which the exposed conductors and thermocouple junction are not coated.

It further was found that the coated thermocouple made according to the present invention had a high insulating resistance. This indicated that the ceramic enamel coating 52 had no adverse effect on the insulating core 50. This is important since many dielectric or insulating materials when subjected to high temperatures tend to become semi-conductive when approaching the fluid state. If the dielectric material surrounding the conductors 14—16 become semi-conductive, then errors in temperature indication will occur since there will be leakage paths for current to ground. The insulation resistance to ground of the thermocouple 10 was found to be good at the operating conditions encountered in use.

The ceramic coating 52 was also found to be highly resistant to thermal shock. The coating 52 adhered to both the conductors 14—16 and to the welded junction 18 even when extreme and sudden changes in temperature were applied thereto.

It was further found that the coated thermocouple junction made in accordance with the present invention exhibited good calibration characteristics in that the thermocouple junctions were readily reproducible and maintained their calibration throughout the expected service life. It is believed a good calibrating characteristic results at least in part from the annealing and other preparation of the conductors and the welded junction before coating. Surface preparation and heat treatment are believed to change the thermoelectric properties of the junction toward the positive side and that annealing in a reducing atmosphere changes the thermoelectric properties toward the negative side. The result of the combined operations is to produce a thermocouple which has good calibration characteristics which are retained throughout its operative life.

To summarize, it was found that the enamel coating 52 adhered to all portions of the surface of the conductors 14 and 16 and to the junction 18 as well as to the insulating core 50. There was no evidence of spalling even at the junction at any time. The coating substantially eliminated absorption of liquid fuel into the insulating core 50 around conductors 14 and 16. In addition, coating 52 protects the junction 18 and the thermocouple conductors from corrosive atmospheres encountered and from abrasion caused by particles in the exhaust stream. The coefficient of expansion of the coating 52 is highly compatible with both the Alumel and Chromel conductors, which results in good resistance to thermal shock and a long operating life. The insulating resistance to ground of the completed thermocouple was good and the calibration was substantially the same as that of an uncoated thermocouple junction.

In the manufacture of these coated thermocouples for use in aircraft gas turbine engines, each thermocouple is tested with respect to each of the characteristics described above, and any thermocouple departing in any particular from the corresponding narrow range of the standard specification is rejected. For example, the permissible range of the response rate of these coated thermocouples in the standard specification is within a narrow band that does not depart more than 5% from that of the corresponding uncoated thermocouples.

All of the above advantages are achieved in these thermocouples by a homogeneous, single layer of ceramic coating applied in one step. It further has been found that it is necessary to have the three separate frits Nos. 1, 2 and 3 present in the slip before firing in order to obtain the desired characteristics of each, since it also has been found that a combined composition frit having the same gross composition as the combined frits Nos. 1, 2 and 3 does not produce a satisfactory enamel coating 52.

The proportions of the various ingredients in frits Nos. 1, 2 and 3 illustrated in Example I, can be varied and still produce a satisfactory enamel coating 52 in accordance with the teachings of the present invention. The following table sets forth the preferred range of composition for each of the ingredients in each of the three frits when coating thermocouples for use in exhaust streams of aircraft gas turbines:

| Ingredients | Frit Number | | |
| --- | --- | --- | --- |
| | 1 | 2 | 3 |
| | Percent | Percent | Percent |
| Silica | 48.0–52.0 | 38.0–42.0 | 28.0–34.0 |
| Borax | 11.0–15.0 | 27.0–33.0 | 10.0–30.0 |
| Aluminum Hydrate | 4.0– 6.0 | 4.0– 6.0 | 1.0– 3.0 |
| Molybdenum Oxide | .5– 4.5 | .5– 4.5 | .5– 4.5 |
| Barium Oxide | 1.0– 3.0 | | 30.0–40.0 |
| Cobalt Oxide | | .5– 3.0 | |
| Titanium Oxide | 10.0–15.0 | | |
| Fluorspar | 10.0–20.0 | 2.0–10.0 | |
| Sodium Nitrate | 2.5– 4.5 | 8.0–15.0 | |
| Zinc Oxide | 3.0– 6.0 | | 2.0– 7.0 |

The above ranges are based on estimates from partial analytical surveys of the frits utilized.

Although the optimum ratio by weight among frits Nos. 1, 2 and 3 were given above in Example I, other proportions of these three frits can be used to achieve a good ceramic coating 52 in accordance with this invention. More specifically, it has been found that the amount of frit No. 1 used in forming the blended frit may be from about 10 to about 40 parts by weight, the amount of frit No. 2 can be from about 2 to about 20 parts by weight and the amount of frit No. 3 can be from about 60 to about 90 parts by weight.

The 50 parts by weight of silica and the 30 parts by weight of chromium oxide disclosed in Example I in the slip serve as refractory materials. Other refractory materials which might be substituted at least in part for the silica and the chromium oxide disclosed in Example I, include feldspar, calcined alumina, zirconium oxide and quartz. Instead of 50 parts by weight of silica in the slip, as little as 40 parts or as much as 60 parts may be used. Instead of 30 parts by weight of chromium oxide as little as 20 parts and as much as 50 parts may be used.

The clay in the composition of Example I acts as a suspension agent to keep the frit particles in suspension. It has been found that as little as three parts by weight of clay may be used or as many as eight parts by weight of clay may be used in the disclosed composition and still obtain a good ceramic coating 52 on the thermocouple. Other suspension materials which may be used to replace part or all of the clay disclosed in Example I include sodium nitrite, potassium nitrite and bentonite.

The slip is preferably adjusted to a specific gravity from between 1.65 to about 1.68. It is then allowed to set to a pick-up of from about 45 to about 55 grams wet on a square foot plate.

The slightly reducing atmosphere used in annealing the thermocouples prior to ceramic coating, may vary slightly in composition from that disclosed in Example I and still be satisfactory so long as the essential reducing characteristics of the atmosphere are preserved. A slightly lower or higher annealing temperature may be used provided that the time of annealing is correspondingly adjusted to achieve the degree of annealing described above. Similarly the firing or maturing atmosphere may have the composition thereof slightly altered providing the reducing character thereof is essentially maintained. The firing temperature may be slightly greater or slightly less provided the firing time is appropriately adjusted.

The thickness of the ceramic coating is preferably about 0.001 inch but slightly less or greater thicknesses can be used and up to as much as 0.002 inch.

Figure 3:
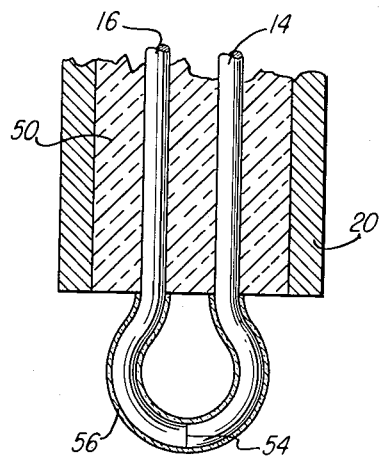
Figure 3 is a view similar to Figure 2 showing the invention applied to a butt-welded loop junction.

Other shapes of thermocouple junctions can be coated in accordance with the present invention. There is shown in Figure 3 of the drawings, a thermocouple junction formed of Chromel and Alumel conductors 14 and 16. The junction designated by the numeral 54 is butt-welded and is of the loop type. A ceramic coating 56 like coating 52 described above is shown applied around the portions of conductors 14 and 16 which extend beyond the insulating core 50 and about the thermocouple junction 54. Ceramic coating 56 seals against the insulating core 50 whereby to seal the interface between the conductors 14—16 and the insulating material 50 to prevent access of fuel thereto. The ceramic coated loop-junction of Figure 3 possesses all of the advantages described above with respect to the ceramic coated V-junction 18.

It will be seen that there has been provided a ceramic coating composition for thermocouples and a method of applying the ceramic coating which fulfills all of the objects and advantages described above. Although certain preferred forms of the invention have been given for purposes of illustration, it is to be understood that various changes and modifications can be made therein without departing from the spirit and scope of the invention.

What is claimed is:

1. A thermocouple for use in measuring temperatures comprising a pair of conductors of dissimilar metals provided with a thermocouple junction adjacent to the ends thereof and coated with a layer of heat resistant and corrosion resistant enamel intimately bonded thereto and consisting essentially of a fired enamel slip; said slip comprising by weight about 100 parts of blended frits, about 60 to 110 parts of refractory materials, and about 3 to 8 parts of suspension agents; said blended frits comprising by weight about 10 to 40 parts of frit No. 1, about 2 to 20 parts of frit No. 2, and about 60 to 90 parts of frit No. 3; said frit No. 1 comprising by weight about 48.0% to 52.0% silica, 11.0 to 15.0% borax, 4.0 to 6.0% aluminum hydrate, 0.5 to 4.5% molybdenum oxide, 1.0 to 3.0% barium oxide 10.0 to 15.0% titanium oxide, 10.0 to 20.0% fluorspar, 2.5 to 4.5% sodium nitrate, and 3.0 to 6.0% zinc oxide; said frit No. 2 comprising by weight about 38.0 to 42.0% silica, 27.0 to 33.0% borax, 4.0 to 6.0% aluminum hydrate, 0.5 to 4.5% molybdenum oxide, 0.5 to 3.0% cobalt oxide, 2.0 to 10% fluorspar, and 8.0 to 15.0% sodium nitrate; and said frit No. 3 comprising by weight about 28.0 to 34.0% silica, 10.0 to 30.0% borax, 1.0 to 3.0% aluminum hydrate, 0.5 to 4.5% molybdenum oxide, 30.0 to 40.0% barium oxide, and 2.0 to 7.0% zinc oxide.

2. A thermocouple as set forth in claim 1; wherein the refractory materials are selected from the group consisting of silica, chromium oxide, feldspar, calcined alumina, zirconium oxide, and quartz; and the suspension agents are selected from the group consisting of clay, alkali metal nitrites, and bentonite.

3. A thermocouple as set forth in claim 1; wherein the refractory materials comprise by weight about 40 to 60 parts of silica, and about 20 to 50 parts of chromium oxide; and the suspension agent is clay.

4. A thermocouple as set forth in claim 1; wherein the refractory materials comprise by weight about 50 parts of silica, and about 30 parts of chromium oxide; the suspension agent comprises by weight about 5 parts of clay; and the blended frits comprise by weight about 20 parts of frit No. 1, about 5 parts of frit No. 2, and about 75 parts of frit No. 3.

5. The method of applying a fired enamel coating to a thermocouple junction comprising the steps of annealing the uncoated thermocouple junction at an elevated temperature in a reducing atmosphere; thereafter freshening the surface of the thermocouple junction, applying a coating of enamel slip to the freshened thermocouple junction, and firing the coated thermocouple junction at an elevated temperature in a reducing atmosphere to produce a ceramic coating thereon; said enamel slip comprising by weight about 100 parts of blended frits, about 60 to 110 parts of refractory materials, and about 3 to 8 parts of suspension agents; said blended frits comprising by weight about 10 to 40 parts of frit No. 1, about 2 to 20 parts of frit No. 2, and about 60 to 90 parts of frit No. 3; said frit No. 1 comprising by weight about 48.0% to 52.0% silica, 11.0 to 15.0% borax, 4.0 to 6.0% aluminum hydrate, 0.5 to 4.5% molybdenum oxide, 1.0 to 3.0% barium oxide, 10.0 to 15.0% titanium oxide, 10.0 to 20.0% fluorspar, 2.5 to 4.5% sodium nitrate, and 3.0 to 6.0% zinc oxide; said frit No. 2 comprising by weight about 38.0 to 42.0% silica, 27.0 to 33.0% borax, 4.0 to 6.0% aluminum hydrate, 0.5 to 4.5% molybdenum oxide, 0.5 to 3.0% cobalt oxide, 2.0 to 10.0% fluorspar, 8.0 to 15.0% sodium nitrate; and said frit No. 3 comprising by weight about 28.0 to 34.0% silica, 10.0 to 30.0% borax, 1.0 to 3.0% aluminum hydrate, 0.5 to 4.5% molybdenum oxide, 30.0 to 40.0% barium oxide, and 2.0 to 7.0% zinc oxide.

6. The method of applying a fired enamel coating as set forth in claim 5; wherein the annealing step is carried out in a reducing atmosphere comprising by volume about 14.5 parts hydrogen, 10.6 parts carbon monoxide, 4.0 parts carbon dioxide, 2.2 parts methane, and 68.7 parts nitrogen; and wherein the reducing atmosphere used during the firing step comprises by volume about 11 parts hydrogen, 8.2 parts carbon monoxide, 6.2 parts carbon dioxide, 1.5 parts methane, and 73.1 parts nitrogen.

7. The method of applying a fired enamel coating as set forth in claim 6, wherein the annealing step is carried out at a temperature of about 1900° F. in an atmosphere having a dew point of about 80° F., the freshening of the thermocouple junction comprises sandblasting the same with about 30 grit sand at a pressure of about 15 lbs. per square inch, and the firing step is carried out at a temperature of about 1925° F. while the reducing atmosphere is maintained at a dew point of about 40° F.

8. The method of applying a fired enamel coating as set forth in claim 5, wherein the annealing step is carried out at about 1900° F. for about one hour, and the firing step is carried out at about 1925° F. for about twenty minutes.

9. The method of applying a fired enamel coating to a thermocouple junction as set forth in claim 5, wherein the slip is adjusted to a specific gravity of about 1.65 to 1.68 and set to a pick-up of 45 to 55 grams weight on a square foot plate, and the slip is applied to the thermocouple junction in amount such that the fired coating has a thickness of about 0.001 inch to 0.002 inch.

10. The method of applying a fired enamel coating to a thermocouple junction comprising the steps of annealing the uncoated thermocouple junction at a temperature of about 1900° F. for about sixty minutes in a reducing atmosphere comprising by volume about 14.5 parts hydrogen, 10.6 parts carbon monoxide, 4.0 parts carbon dioxide, 2.2 parts methane, and 68.7 parts nitrogen at a dew point of about 80° F., thereafter sandblasting the thermocouple junction with about 30 grit sand at a pressure of about 15 pounds per square inch, applying to the thermocouple junction a coating of enamel slip having a specific gravity of about 1.65 to 1.68 and set to a pick-up of about 45 to 55 grams weight on a square foot plate and milled to a fineness of about 1% retained by a 325 mesh U. S. standard screen, the thickness of the slip on the thermocouple junction being such that the fired coating has a thickness of about 0.001 inch to 0.002 inch, and thereafter firing the coated thermocouple junction at a temperature of about 1925° F. for about twenty minutes in an atmosphere comprising by volume about 11 parts hydrogen, 8.2 parts carbon monoxide, 6.2 parts carbon dioxide, 1.5 parts methane, and 73.1 parts nitrogen at a dew point of about 40° F.; said enamel slip comprising by weight about 100 parts of blended frits, 60 parts of silica, 30 parts of chromium oxide, 5 parts of clay; said blended frits comprising by weight about 20 parts of frit No. 1, about 5 parts of frit No. 2, and about 75 parts of frit No. 3; said frit No. 1 comprising by weight about 48.0% to 52.0% silica, 11.0 to 15.0% borax, 4.0 to 6.0% aluminum hydrate, 0.5 to 4.5% molybdenum oxide, 1.0 to 3.0% barium oxide, 10.0 to 15.0% titanium oxide, 10.0 to 20.0% fluorspar, 2.5 to 4.5% sodium nitrate, and 3.0 to 6.0% zinc oxide; said frit No. 2 comprising by weight about 38.0 to 42.0% silica, 27.0 to 33.0% borax, 4.0 to 6.0% aluminum hydrate, 0.5 to 4.5% molybdenum oxide, 0.5 to 3.0% cobalt oxide, 2.0 to 10.0% fluorspar, and 8.0 to 15.0% sodium nitrate; and said frit No. 3 comprising by weight about 28.0 to 34.0% silica, 10.0 to 30.0% borax, 1.0 to 3.0% aluminum hydrate, 0.5 to 4.5% molybdenum oxide, 30.0 to 40.0% barium oxide, and 2.0 to 7.0% zinc oxide.

11. The method of applying a fired enamel coating to a thermocouple junction comprising the steps of annealing the uncoated thermocouple junction at an elevated temperature in a reducing atmosphere, thereafter sandblasting the thermocouple junction, applying a coating of enamel slip to the thermocouple junction to a thickness of about 0.001 inch to 0.002 inch, and firing the coated thermocouple junction at an elevated temperature in a reducing atmosphere to produce a ceramic coated junction; said enamel slip comprising by weight about 100 parts of blended frits, about 60 to 110 parts of refractory materials, and about 3 to 8 parts of suspension agents; said blended frits comprising by weight about 10 to 40 parts of a high titanium oxide frit, about 2 to 20 parts of a high cobalt oxide frit, and about 60 to 90 parts of a high barium oxide frit.

12. A ceramic coating slip comprising by weight about 100 parts of blended frits, about 60 to 110 parts of refractory materials, and about 3 to 8 parts of suspension agents; said blended frits comprising by weight about 10 to 40 parts of frit No. 1, about 2 to 20 parts of frit No. 2, and about 60 to 90 parts of frit No. 3; said frit No. 1 comprising by weight about 48.0% to 52.0% silica, 11.0 to 15.0% borax, 4.0 to 6.0% aluminum hydrate, 0.5 to 4.5% molybdenum oxide, 1.0 to 3.0% barium oxide, 10.0 to 15.0% titanium oxide, 10.0 to 20.0% fluorspar, 2.5 to 4.5% sodium nitrate, and 3.0 to 6.0% zinc oxide; said frit No. 2 comprising by weight about 38.0 to 42.0% silica, 27.0 to 33.0% borax, 4.0 to 6.0% aluminum hydrate, 0.5 to 4.5 molybdenum oxide, 0.5 to 3.0% cobalt oxide, 2.0 to 10.0% fluorspar, and 8.0 to 15.0% sodium nitrate; and said frit No. 3 comprising by weight about 28.0 to 34.0% silica, 10.0 to 30.0% borax, 1.0 to 3.0% aluminum hydrate, 0.5 to 4.5% molybdenum oxide, 30.0 to 40.0% barium oxide and 2.0 to 7.0% zinc oxide.

13. A ceramic coating slip comprising by weight about 100 parts of blended frits, about 50 parts of silica, about 30 parts of chromium oxide, and about 5 parts of clay; said blended frits comprising by weight about 20 parts of frit No. 1, about 5 parts of frit No. 2, and about 75 parts of frit No. 3; said frit No. 1 comprising by weight about 48.0 to 52.0% silica, 11.0 to 15.0% borax, 4.0 to 6.0% aluminum hydrate, 0.5 to 4.5% molybdenum oxide, 1.0 to 3.0% barium oxide, 10.0 to 15.0% titanium oxide, 10.0 to 20.0% fluorspar, 2.5 to 4.5% sodium nitrate, and 3.0 to 6.0% zinc oxide; said frit No. 2 comprising by weight about 38.0 to 42.0% silica, 27.0 to 33.0% borax, 4.0 to 6.0% aluminum hydrate, 0.5 to 4.5% molybdenum oxide, 0.5 to 3.0% cobalt oxide, 2.0 to 10.0% fluorspar, and 8.0 to 15.0% sodium nitrate; and said frit No. 3 comprising by weight about 28.0 to 34.0% silica, 10.0 to 30.0% borax, 1.0 to 3.0% aluminum hydrate, 0.5 to 4.5% molybdenum oxide, 30.0 to 40.0% barium oxide, and 2.0 to 7.0% zinc oxide.

References Cited in the file of this patent

UNITED STATES PATENTS

| | | |
|---|---|---|
| 2,249,007 | Kinzie et al. | July 15, 1941 |
| 2,293,146 | Kautz | Aug. 18, 1942 |
| 2,525,439 | Abbott | Oct. 10, 1950 |
| 2,707,198 | Jones | Apr. 26, 1955 |
| 2,720,473 | Donahey | Oct. 11, 1955 |

FOREIGN PATENTS

| | | |
|---|---|---|
| 666,637 | Great Britain | Feb. 13, 1952 |
| 699,625 | Great Britain | Nov. 11, 1953 |